US012651311B2

(12) United States Patent
Xiang et al.

(10) Patent No.: US 12,651,311 B2
(45) Date of Patent: Jun. 9, 2026

(54) METHOD AND APPARATUS FOR TRAINING IMAGE RECONSTRUCTION MODEL, STORAGE MEDIUM, AND ELECTRONIC DEVICE

(71) Applicant: SANECHIPS TECHNOLOGY CO., LTD, Shenzhen (CN)

(72) Inventors: Yan Xiang, Shenzhen (CN); Dehui Kong, Shenzhen (CN); Ke Xu, Shenzhen (CN)

(73) Assignee: SANECHIPS TECHNOLOGY CO., LTD., Shenzhen (CN)

( * ) Notice: Subject to any disclaimer, the term of this patent is extended or adjusted under 35 U.S.C. 154(b) by 236 days.

(21) Appl. No.: 18/721,427

(22) PCT Filed: Feb. 28, 2022

(86) PCT No.: PCT/CN2022/078412
§ 371 (c)(1),
(2) Date: Jun. 18, 2024

(87) PCT Pub. No.: WO2023/115697
PCT Pub. Date: Jun. 29, 2023

(65) Prior Publication Data
US 2025/0069188 A1     Feb. 27, 2025

(30) Foreign Application Priority Data
Dec. 20, 2021    (CN) .......................... 202111565036.0

(51) Int. Cl.
*G06T 3/4046*        (2024.01)
*G06T 3/4053*        (2024.01)

(52) U.S. Cl.
CPC .......... *G06T 3/4046* (2013.01); *G06T 3/4053* (2013.01)

(58) Field of Classification Search
CPC ..... G06T 3/4046; G06T 3/4053; G06T 17/00; G06N 3/045; G06N 3/0464; G06N 3/08; Y02T 10/40; G06V 10/774
See application file for complete search history.

(56) References Cited

U.S. PATENT DOCUMENTS 9,558,554 B1     1/2017   Mckenna et al.

FOREIGN PATENT DOCUMENTS

CN        111681178 A       9/2020
CN        111967573 A      11/2020
(Continued)

OTHER PUBLICATIONS

Jiang Xinrui et al., "Training Binary Neural Network without Batch Normalization for Image Super-Resolution" Proceedings of the AAAI Conference on Artificial Intelligence, vol. 35, No. 2, pub. Jan. 2021, (Year: 2021).*
(Continued)

*Primary Examiner* — Mekonen T Bekele
(74) *Attorney, Agent, or Firm* — CANTOR COLBURN LLP

(57)        ABSTRACT

Provided in the embodiments of the present disclosure are a method and apparatus for training an image reconstruction model, a storage medium, and an electronic device. The method includes: acquiring a target teacher image reconstruction model; training, by using the target sample image set, a student image reconstruction model to be trained, and ending the training until a target loss value satisfies a second preset loss condition, so as to obtain a target student image reconstruction model, wherein the target loss value is a loss value determined according to a first loss value and a second loss value, and the second loss value is a loss value determined according to a difference value between a predicted value and a real value respectively determined by the student
(Continued)

Acquiring a target teacher image reconstruction model, a target sample image set and a actual reconstructed image set corresponding to the target sample image set, wherein the target teacher image reconstruction model is a model obtained by training, by using the target sample image set, a teacher image reconstruction model to be trained, and a loss value between a predicted reconstructed image set, which is determined by the target teacher image reconstruction model according to the target sample image set, and the actual reconstructed image set satisfies a first preset loss condition  ⌐ S202

Training, by using the target sample image set, a student image reconstruction model to be trained, and ending the training until a target loss value corresponding to the student image reconstruction model to be trained satisfies a second preset loss condition, so as to obtain a target student image reconstruction model, wherein the target loss value is a loss value determined according to a first loss value and a second loss value; the first loss value is a loss value between a predicted reconstructed image determined, according to a sample image in the target sample image set, by the student image reconstruction model to be trained and a corresponding actual reconstructed image in the actual reconstructed image set; the second loss value is a loss value determined according to a first difference value and a second difference value; the first difference value is a difference value determined according to difference values between respective pixel points in a first predicted reconstructed image and corresponding pixel points in a corresponding actual reconstructed image in the actual reconstructed image set; the first predicted reconstructed image is a predicted reconstructed image determined, according to the sample image in the target sample image set, by the student image reconstruction model to be trained; the second difference value is a difference value determined according to difference values between respective pixel points in a second predicted reconstructed image and corresponding pixel points in a corresponding actual reconstructed image in the actual reconstructed image set; and the second predicted reconstructed image is a predicted reconstructed image determined by the target teacher image reconstruction model according to the sample image in the target sample image set  ⌐ S204 image reconstruction model to be trained and the target teacher image reconstruction model.

20 Claims, 4 Drawing Sheets

(56) References Cited

FOREIGN PATENT DOCUMENTS

| | | |
|---|---|---|
| CN | 112581370 A | 3/2021 |
| CN | 112733808 A | 4/2021 |

OTHER PUBLICATIONS

European Search Report for Application No. 22909038.6 , dated Mar. 18, 2025, 9 pages.

He, Zibin, et al. "Fakd: Feature-affinity based knowledge distillation for efficient image super-resolution." 2020 IEEE international conference on image processing (ICIP). IEEE, (2020): pp. 518-522.

Jiang, Xinrui, et al. "Training binary neural network without batch normalization for image super-resolution." Proceedings of the AAAI Conference on Artificial Intelligence. vol. 35. No. 2. (2021); pp. 1700-1707.

Chinese Office Action; Application No. 2021115650360; Filing Date Dec. 20, 2021; 4 pages.

International Search Report for corresponding application PCT/CN2022/078412 filed Feb. 28, 2022; Mail date Aug. 31, 2022.

* cited by examiner

Input/output device 108

Transmission device 106

Processor 102

Memory 104

Fig. 2

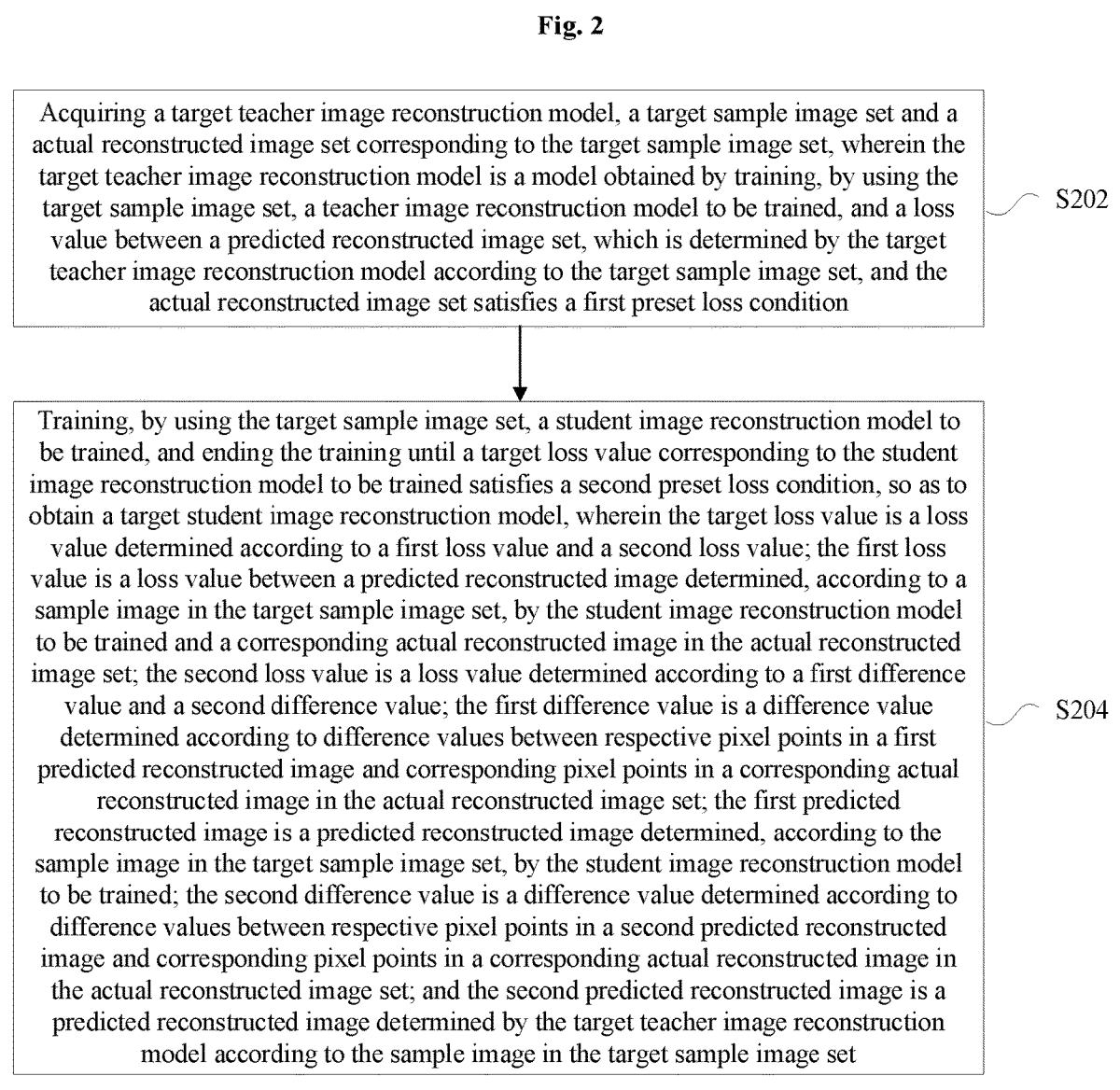

Acquiring a target teacher image reconstruction model, a target sample image set and a actual reconstructed image set corresponding to the target sample image set, wherein the target teacher image reconstruction model is a model obtained by training, by using the target sample image set, a teacher image reconstruction model to be trained, and a loss value between a predicted reconstructed image set, which is determined by the target teacher image reconstruction model according to the target sample image set, and the actual reconstructed image set satisfies a first preset loss condition     S202

Training, by using the target sample image set, a student image reconstruction model to be trained, and ending the training until a target loss value corresponding to the student image reconstruction model to be trained satisfies a second preset loss condition, so as to obtain a target student image reconstruction model, wherein the target loss value is a loss value determined according to a first loss value and a second loss value; the first loss value is a loss value between a predicted reconstructed image determined, according to a sample image in the target sample image set, by the student image reconstruction model to be trained and a corresponding actual reconstructed image in the actual reconstructed image set; the second loss value is a loss value determined according to a first difference value and a second difference value; the first difference value is a difference value determined according to difference values between respective pixel points in a first predicted reconstructed image and corresponding pixel points in a corresponding actual reconstructed image in the actual reconstructed image set; the first predicted reconstructed image is a predicted reconstructed image determined, according to the sample image in the target sample image set, by the student image reconstruction model to be trained; the second difference value is a difference value determined according to difference values between respective pixel points in a second predicted reconstructed image and corresponding pixel points in a corresponding actual reconstructed image in the actual reconstructed image set; and the second predicted reconstructed image is a predicted reconstructed image determined by the target teacher image reconstruction model according to the sample image in the target sample image set     S204

Fig. 3
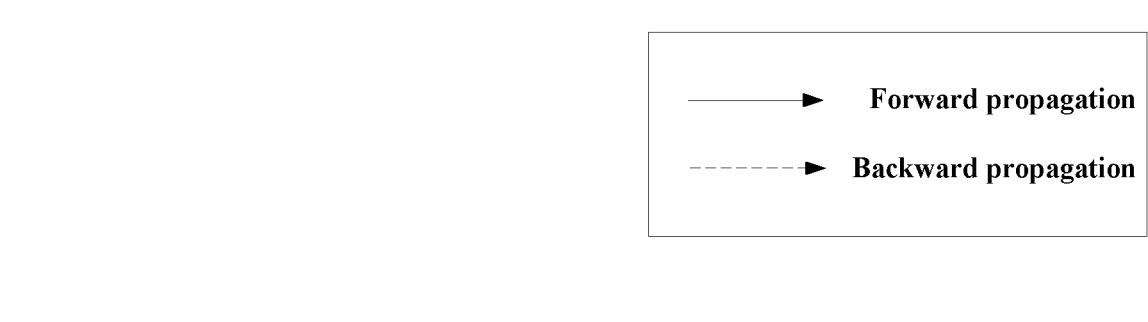
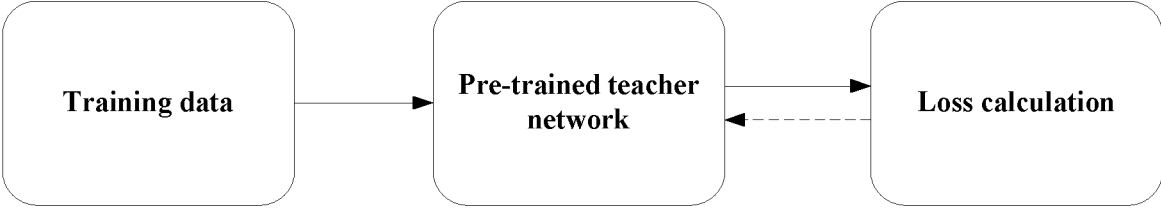
Fig. 4
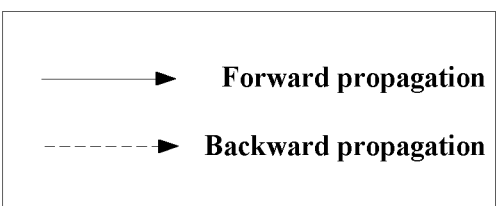
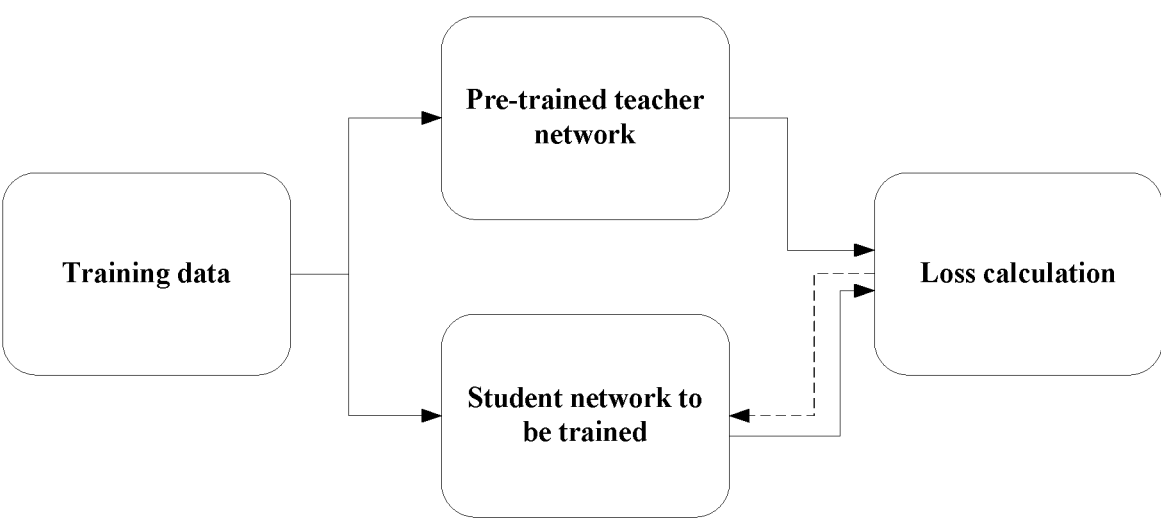

METHOD AND APPARATUS FOR TRAINING IMAGE RECONSTRUCTION MODEL, STORAGE MEDIUM, AND ELECTRONIC DEVICE

CROSS-REFERENCE TO RELATED APPLICATION

The present disclosure is a National Stage Filing of the PCT International Application No. PCT/CN2022/078412 filed on Feb. 28, 2022, which is based upon and claims priority to Chinese patent application CN202111565036.0, filed on Dec. 20, 2021 and entitled "Method and Apparatus for Training Image Reconstruction Model, Storage Medium, and Electronic Device", the disclosure of which is incorporated herein by reference in its entirety.

TECHNICAL FIELD

The present disclosure relates to the field of computer technologies, and in particular, to a method and apparatus for training an image reconstruction model, a storage medium, and an electronic device.

BACKGROUND

In recent years, super-resolution reconstruction technology has become an important research topic in the fields of image processing and computer vision. As a technology that may convert a low-resolution image into a high-resolution image with better visual effect through processing, the super-resolution reconstruction technology has a wide range of applications in satellite imagery, military reconnaissance, medical diagnosis, remote sensing, and other fields. In the related art, deep learning methods are applied to the image reconstruction process, so as to learn the mapping relationship between the low-resolution images and the high-resolution images by utilizing neural networks. This method establishes the mapping relationship between the low-resolution images and the high-resolution images through learning from a large number of data samples. However, as the network model becomes more complex, a larger number of network parameters need to be trained, which increases the difficulty of training. In other words, the methods in the related technologies have problems such as large calculation cost and high difficulty in training.

For the problem in the related art that the calculation cost for the image reconstruction model is large, no effective solution has been proposed.

SUMMARY

Embodiments of the present disclosure provide a method and apparatus for training an image reconstruction model, a storage medium, and an electronic device, which may at least solve the problem in the related art that a calculation cost for an image reconstruction model is large.

According to one aspect of the embodiments of the present disclosure, a method for training an image reconstruction model is provided, including: acquiring a target teacher image reconstruction model, a target sample image set and a actual reconstructed image set corresponding to the target sample image set, wherein the target teacher image reconstruction model is a model obtained by training, by using the target sample image set, a teacher image reconstruction model to be trained, and a loss value between a predicted reconstructed image set, which is determined by the target teacher image reconstruction model according to the target sample image set, and the actual reconstructed image set satisfies a first preset loss condition; and training, by using the target sample image set, a student image reconstruction model to be trained, and ending the training until a target loss value corresponding to the student image reconstruction model to be trained satisfies a second preset loss condition, so as to obtain a target student image reconstruction model, wherein the target loss value is a loss value determined according to a first loss value and a second loss value; the first loss value is a loss value between a predicted reconstructed image determined, according to a sample image in the target sample image set, by the student image reconstruction model to be trained and a corresponding actual reconstructed image in the actual reconstructed image set; the second loss value is a loss value determined according to a first difference value and a second difference value; the first difference value is a difference value determined according to difference values between respective pixel points in a first predicted reconstructed image and corresponding pixel points in a corresponding actual reconstructed image in the actual reconstructed image set; the first predicted reconstructed image is a predicted reconstructed image determined, according to the sample image in the target sample image set, by the student image reconstruction model to be trained; the second difference value is a difference value determined according to difference values between respective pixel points in a second predicted reconstructed image and corresponding pixel points in a corresponding actual reconstructed image in the actual reconstructed image set; and the second predicted reconstructed image is a predicted reconstructed image determined by the target teacher image reconstruction model according to the sample image in the target sample image set.

According to another aspect of the embodiments of the present disclosure, an apparatus for training an image reconstruction model is further provided, including: an acquisition module, configured to acquire a target teacher image reconstruction model, a target sample image set and a actual reconstructed image set corresponding to the target sample image set, wherein the target teacher image reconstruction model is a model obtained by training, by using the target sample image set, a teacher image reconstruction model to be trained, and a loss value between a predicted reconstructed image set, which is determined by the target teacher image reconstruction model according to the target sample image set, and the actual reconstructed image set satisfies a first preset loss condition; and a training module, configured to train, by using the target sample image set, a student image reconstruction model to be trained, and end the training until a target loss value corresponding to the student image reconstruction model to be trained satisfies a second preset loss condition, so as to obtain a target student image reconstruction model, wherein the target loss value is a loss value determined according to a first loss value and a second loss value; the first loss value is a loss value between a predicted reconstructed image determined, according to a sample image in the target sample image set, by the student image reconstruction model to be trained and a corresponding actual reconstructed image in the actual reconstructed image set; the second loss value is a loss value determined according to a first difference value and a second difference value; the first difference value is a difference value determined according to difference values between respective pixel points in a first predicted reconstructed image and corresponding pixel points in a corresponding actual reconstructed image in the actual reconstructed image set; the first predicted reconstructed image is a predicted reconstructed image determined, according to the sample image in the target sample image set, by the student image reconstruction model to be trained; the second difference value is a difference value determined according to difference values between respective pixel points in a second predicted reconstructed image and corresponding pixel points in a corresponding actual reconstructed image in the actual reconstructed image set; and the second predicted reconstructed image is a predicted reconstructed image determined by the target teacher image reconstruction model according to the sample image in the target sample image set.

According to another aspect of the embodiments of the present disclosure, a computer-readable storage medium is further provided, wherein the computer-readable storage medium stores a program, wherein the program, when running on a processor, causes the processor to execute the operations in any one of the method embodiments.

According to another aspect of the embodiments of the present disclosure, an electronic device is also provided, including a memory, a processor and a computer program stored in the memory and operable on the processor, wherein the processor is configured to run the computer program to execute the operations in any one of the method embodiments.

BRIEF DESCRIPTION OF THE DRAWINGS

Drawings, provided for further understanding of the present disclosure and forming a part of the specification, are used to explain the present disclosure together with exemplary embodiments of the present disclosure rather than to limit the present disclosure. In the drawings:

FIG. 2 is a flowchart of a method for training an image reconstruction model according to some embodiments of the present disclosure;

FIG. 3 is a schematic diagram of training a teacher network according to some exemplary embodiments of the present disclosure;

FIG. 4 is a schematic diagram of training a student network according to some exemplary embodiments of the present disclosure.

DETAILED DESCRIPTION

In order to make those having ordinary skill in the art better understand the solutions of the present disclosure, the technical solutions in the embodiments of the present disclosure are clearly and completely described with reference to the accompanying drawings in the embodiments of the present disclosure. Apparently, the described embodiments are merely a part rather than all of the embodiments of the present disclosure. All other embodiments obtained by those having ordinary skill in the art based on the embodiments of the present disclosure without creative efforts shall belong to the scope of protection of the present disclosure.

It should be noted that, terms such as "first" and "second" in the specification, claims, and accompanying drawings of the present disclosure are used to distinguish similar objects, but are not necessarily used to describe a specific sequence or order. It should be understood that the data so used may be interchanged where appropriate so that the embodiments of the present disclosure described herein may be implemented in sequences other than those illustrated or described herein. In addition, the terms "include" and "have", and any variations thereof, are intended to cover a non-exclusive inclusion, for example, a process, method, system, product, or apparatus that includes a series of operations or units is not necessarily limited to those operations or units that are expressly listed, but may include other operations or units that are not expressly listed or inherent to such process, method, product, or apparatus.

Figure 1:
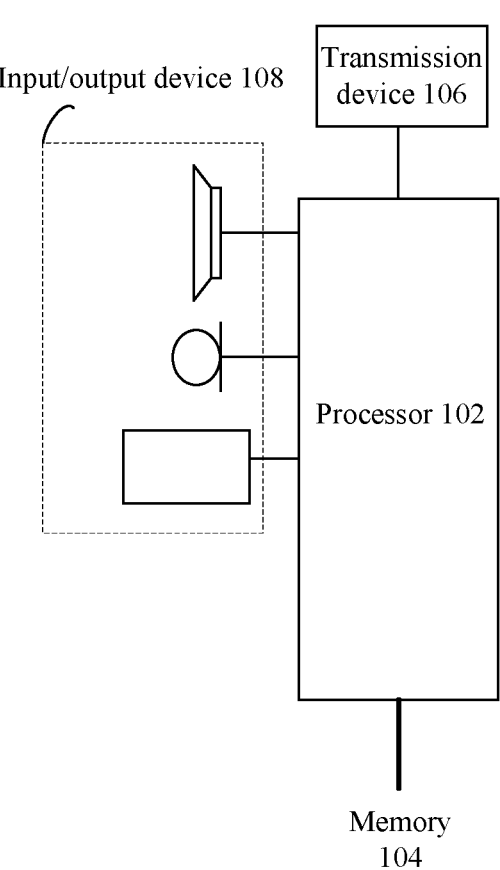
FIG. 1 is a block diagram of a hardware structure of a terminal for implementing a method for training an image reconstruction model according to some embodiments of the present disclosure.

The method embodiments provided in the embodiments of the present application may be executed in a terminal or a server, for example, a mobile terminal, a computer terminal, a server, or a similar computing apparatus. By taking the running on a terminal as an example, FIG. 1 is a block diagram of a hardware structure of a terminal for implementing a method for training an image reconstruction model according to some embodiments of the present disclosure. As shown in FIG. 1, the terminal may include one or more (only one is shown in FIG. 1) processors 102 (each processor 102 may include, but are not limited to, a microprocessor (e.g., Micro Controller Unit (MCU)) or a processing apparatus such as a programmable logic device (e.g., Field Programmable Gate Array (FPGA)) and a memory 104 configured to store data. In an exemplary embodiment, the terminal may further include a transmission device 106 configured to perform a communication function and an input/output device 108. Those having ordinary skill in the art may understand that the structure shown in FIG. 1 is merely exemplary, which does not limit the structure of the foregoing terminal. For example, the terminal may further include more or fewer components than shown in FIG. 1, or have a different configuration from that shown in FIG. 1.

The memory 104 may be configured to store a computer program, for example, a software program of application software and a module, for example, a computer program corresponding to the method for training the image reconstruction model in the embodiments of the present disclosure. The processor 102 executes various function applications and data processing by running the computer program stored in the memory 104, so as to implement the foregoing method. The memory 104 may include high-speed random access memory, and may also include non-volatile memory, such as one or more magnetic storage devices, flash memory, or other non-volatile solid-state memory. In some examples, the memory 104 may further include a memory remotely located from the one or more processors 102, which may be connected to the terminal over a network. Examples of such network include, but are not limited to, the Internet, an intranet, a local area network, a mobile communication network, and combinations thereof.

The transmission device 106 is configured to receive or transmit data via a network. Specific examples of the described network may include a wireless network provided by a communication provider of the terminal. In an example, the transmission device 106 may include a Network Interface Controller (NIC) that may be coupled to other network devices via a base station to communicate with the Internet. In an example, the transmission device 106 may be a Radio Frequency (RF) module configured to communicate wirelessly with the Internet.

At present, in the field of computer vision technology, an image magnification method based on convolutional neural networks shows superior performance compared to traditional methods. However, in practical applications, the large number of network parameters and the high model computational cost often make it difficult to deploy the network model. Therefore, it is usually necessary to lightweight the network model. Lightweight methods typically include pruning, quantization, and knowledge distillation. The knowledge distillation is an analogy to the "distillation process" in physics and typically involves two network models which are respectively a "teacher" model with a large parameter quantity and high complexity, and a "student" model with a small parameter quantity and low complexity. In the knowledge distillation algorithm based on the convolutional neural networks, a vast majority of algorithms are usually used to solve classification problems and typically use the logits output by the "teacher" network, the output of intermediate layers in the network, or the relationship between the output of intermediate layers as supervision to train the "student" network. However, the knowledge distillation algorithm is almost not applied to the regression problems in computer vision, such as image reconstruction or super-resolution magnification. The embodiments of the present disclosure provide an improved method for training an image reconstruction model based on the knowledge distillation algorithm.

The present embodiment provides a method for training an image reconstruction model. FIG. 2 is a flowchart of a method for training an image reconstruction model according to some embodiments of the present disclosure. As shown in FIG. 2, the flow includes the following operations S202 and S204.

At operation S202, a target teacher image reconstruction model, a target sample image set and a actual reconstructed image set corresponding to the target sample image set are acquired, wherein the target teacher image reconstruction model is a model obtained by training, by using the target sample image set, a teacher image reconstruction model to be trained, and a loss value between a predicted reconstructed image set, which is determined by the target teacher image reconstruction model according to the target sample image set, and the actual reconstructed image set satisfies a first preset loss condition.

At operation S204, a student image reconstruction model to be trained is trained by using the target sample image set, and the training ends until a target loss value corresponding to the student image reconstruction model to be trained satisfies a second preset loss condition, so as to obtain a target student image reconstruction model, wherein the target loss value is a loss value determined according to a first loss value and a second loss value; the first loss value is a loss value between a predicted reconstructed image determined, according to a sample image in the target sample image set, by the student image reconstruction model to be trained and a corresponding actual reconstructed image in the actual reconstructed image set; the second loss value is a loss value determined according to a first difference value and a second difference value; the first difference value is a difference value determined according to differences value between respective pixel points in a first predicted reconstructed image and corresponding pixel points in a corresponding actual reconstructed image in the actual reconstructed image set; the first predicted reconstructed image is a predicted reconstructed image determined, according to the sample image in the target sample image set, by the student image reconstruction model to be trained; the second difference value is a difference value determined according to difference values between respective pixel points in a second predicted reconstructed image and corresponding pixel points in a corresponding actual reconstructed image in the actual reconstructed image set; and the second predicted reconstructed image is a predicted reconstructed image determined by the target teacher image reconstruction model according to the sample image in the target sample image set.

By following the above operations, the output of the target teacher image reconstruction model trained by using the target sample image set and the corresponding actual reconstructed image set is used as supervision to train the student image reconstruction model; a difference value between a predicted reconstructed image result of the target teacher image reconstruction model and a actual reconstructed image is used to constrain the loss of a difference value between a predicted reconstructed image result of the student image reconstruction model and the corresponding actual reconstructed image, so as to obtain a target student image reconstruction model that satisfies the second preset loss condition. This allows the target student image reconstruction model to more effectively learn the knowledge of the target teacher image reconstruction model, thereby achieving the goal of bringing the accuracy of the target student image reconstruction model closer to that of the target teacher image reconstruction model while greatly reducing the computational cost. By using the above technical solution, the problem of large computational cost in image reconstruction models is solved, and the effect of reducing the computational cost of the network model is achieved.

The foregoing operations may be executed by a terminal, or an image processing device, such as a network model training device, or a model training platform, or a model trainer. The foregoing operations may also be executed by, but is not limited to be executed by, another processing device or processing unit that has a similar processing capability. The following description takes the image processing device executing the foregoing operations as an example (which is only an exemplary description, and in actual operations, other devices or modules may also execute the foregoing operations).

In the described embodiment, the image processing device acquires a pre-trained target teacher image reconstruction model (or referred to as a target teacher network), a target sample image set and a actual reconstructed image set corresponding to the target sample image set, wherein the target teacher image reconstruction model is a model obtained by training, by using the target sample image set, a teacher image reconstruction model to be trained, and the loss value between the actual reconstructed image set and the predicted reconstructed image set determined by the target teacher image reconstruction model according to the target sample image set satisfies a first preset loss condition. In the embodiment, the first preset loss condition is that a loss value of the target teacher image reconstruction model reaches a convergence condition, for example, the loss value reaches 0, or 0.1, or 0.5 or other value. The image processing device then trains a student image reconstruction model to be trained (or referred to as a student network to be trained) by using the target sample image set, and ends the training until a target loss value corresponding to the student image reconstruction model to be trained satisfies a second preset loss condition, so as to obtain a target student image reconstruction model (or referred to as a target student network). The second preset loss condition is that a loss value of the target student image reconstruction model reaches a convergence condition, for example, the target loss value reaches 0, 0.2, 0.6 or another value. When the target loss value fails to satisfy the second preset condition, the image processing device continues to train the student image reconstruction model to be trained. The target loss value is a loss value determined according to the first loss value and the second loss value, and the second loss value is a loss value determined according to a first difference value and a second difference value, wherein the first difference value is a difference value determined according to difference values between respective pixel points in a reconstructed image predicted by the student image reconstruction model to be trained and pixel points in a corresponding actual reconstructed image, and the second difference value is a difference value determined according to difference values between respective pixel points in a reconstructed image predicted by the target teacher image reconstruction model and pixel points in a corresponding actual reconstructed image, That is, the output of the target teacher image reconstruction model is used as supervision to train the student image reconstruction model to be trained, and the difference value between the predicted reconstructed image result of the target teacher image reconstruction model and the corresponding actual reconstructed image is used to carry out loss constraint on the difference value between the predicted reconstructed image result of the student image reconstruction model to be trained and the actual reconstructed image, so as to obtain the target student image reconstruction model whose target loss value satisfies the second preset loss condition. By virtue of the solution, the purpose of improving the accuracy of the student image reconstruction model to be trained may be achieved. In this way, after training is completed, the target student image reconstruction model may be deployed in a corresponding scenario, thereby achieving the purpose of enabling the target student image reconstruction model to learn knowledge from the target teacher image reconstruction model more effectively, so that the amount of calculation may be reduced under the premise that the accuracy of the target student image reconstruction model may be ensured to be close to that of the target teacher image reconstruction model. By means of the technical solution, the problem existing in the related art of lacking a method for performing light weight processing on a network model is solved, and the effect of reducing the calculation amount of the network model is achieved.

In an exemplary embodiment, the operation of training, by using the target sample image set, the student image reconstruction model to be trained, and ending the training until the target loss value corresponding to the student image reconstruction model to be trained satisfies the second preset loss condition includes: repeating the following operations until the target loss value corresponding to the student image reconstruction model to be trained satisfies the second preset loss condition: acquiring a current sample image in the target sample image set and a current actual reconstructed image, corresponding to the current sample image, in the actual reconstructed image set; inputting the current sample image to the student image reconstruction model to be trained, so as to obtain a first current predicted reconstructed image; determining a first current loss value according to the first current predicted reconstructed image and the current actual reconstructed image, wherein the first current loss value represents a loss between the first current predicted reconstructed image and the current actual reconstructed image; inputting the current sample image into the target teacher image reconstruction model to obtain a second current predicted reconstructed image; determining a second current loss value corresponding to the current sample image according to difference values between respective pixel points in the first current predicted reconstructed image and corresponding pixel points in the current actual reconstructed image and difference values between respective pixel points in the second current predicted reconstructed image and corresponding pixel points in the current actual reconstructed image; determining the target loss value corresponding to the current sample image according to the first current loss value and the second current loss value; when the target loss value corresponding to the current sample image satisfies the second preset loss condition, ending the training, so as to obtain the target student image reconstruction model; and when the target loss value corresponding to the current sample image does not satisfy the second preset loss condition, adjusting a parameter in the student image reconstruction model to be trained. In the present embodiment, the second current loss value is determined based on a difference value (corresponding to the described first difference value) between respective pixel points in a reconstructed image (namely, the described first current predicted reconstructed image) obtained by predicting a current sample image based on the student image reconstruction model to be trained and corresponding pixel points in a current actual reconstructed image, and based on a difference value (corresponding to the described second difference value) between respective pixel points in a reconstructed image (namely, the described second current predicted reconstructed image) obtained by predicting the current sample image by the target teacher image reconstruction model and corresponding pixel points in the current actual reconstructed image, i.e., the difference value obtained by the target teacher image reconstruction model may be used to constrain the loss of the difference value of the student image reconstruction model to be trained, so that the target student image reconstruction model may learn the knowledge from the target teacher image reconstruction model more effectively. In addition, based on the first current loss value and the second current loss value, a target loss value of the current sample image may be determined, and the training may be ended until the target loss value satisfies a second preset condition, so that the target student image reconstruction model satisfying the requirement may be obtained. The second preset loss condition is that a loss value of the target student image reconstruction model reaches a convergence condition, for example, the target loss value reaches 0, 0.2, 0.6 or another value. By means of the present embodiment, the target teacher image reconstruction model is used in training the student image reconstruction model to be trained, so that the purpose of improving the accuracy of the student image reconstruction model to be trained may be achieved, thereby obtaining the target student image reconstruction model satisfying requirements.

In an exemplary embodiment, the operation of determining the second current loss value corresponding to the current sample image according to the difference values between the respective pixel points in the first current predicted reconstructed image and the corresponding pixel points in the current actual reconstructed image and the difference values between the respective pixel points in the second current predicted reconstructed image and the corresponding pixel points in the current actual reconstructed image includes: acquiring the difference values between the respective pixel points in the first current predicted reconstructed image and the corresponding pixel points in the current actual reconstructed image; determining a first mean value and a first variance value according to the difference values between the respective pixel points in the first current predicted reconstructed image and the corresponding pixel points in the current actual reconstructed image; acquiring the difference values between the respective pixel points in the second current predicted reconstructed image and the corresponding pixel points in the current actual reconstructed image; determining a second mean value and a second variance value according to the difference values between the respective pixel points in the second current predicted reconstructed image and the corresponding pixel points in the current actual reconstructed image; and determining the second current loss value according to the first mean value, the first variance value, the second mean value, and the second variance value. In the embodiment, the difference values between the respective pixel points in the first current predicted reconstructed image and the corresponding pixel points in the current actual reconstructed image follow a specific distribution. Likewise, the difference values between the respective pixel points in the second current predicted reconstructed image and the corresponding pixel points in the current actual reconstructed image also follow a specific distribution. In practical applications, when using L1 loss as an image reconstruction loss for training, the difference values between the respective pixel points may be assumed (as a priori) to follow a Laplace distribution. Similarly, when using L2 loss as the image reconstruction loss for training, the difference values between the respective pixel points may be assumed (as a priori) to follow a Gaussian distribution. Taking the example of using L1 loss for image reconstruction, assuming that $x_i$ is the difference value of the i-th pixel point in the difference values between the respective pixel points in the first current predicted reconstructed image and the corresponding pixel points in the current actual reconstructed image, where $1 \le i \le C*H*W$ (C, H, W being a channel number, a height and a width, respectively), $x_i$ follows the Laplace distribution, and a first mean value is a mean value of $x_1$, for example, $\mu 1 = mean(x_i)$, wherein $\mu 1$ is the first mean value, and the first variance value is $D1 = var(x_i)$. Then, $\mu 1$ is taken as a position parameter in the Laplace distribution function, and $b_1$ is determined according to $2b_1{}^2 = var(x_i)$ as a scale parameter in the Laplace distribution function. In this way, the Laplacian distribution function of the $x_i$ distribution may be determined. By the same method, assuming that $x_j$ is the difference value of the j-th pixel point in the difference values between the respective pixel points in the second current predicted reconstructed image and the corresponding pixel points in the current actual reconstructed image, where $1 \le j \le C*H*W$ (C, H, W being a channel number, a height and a width, respectively), $x_j$ follows the Laplace distribution, and a second mean value is a mean value of $x_j$, for example, $\mu 2 = mean(x_j)$, wherein $\mu 2$ is the second mean value, and the second variance value is $D2 = var(x_j)$. Then, $\mu 2$ is taken as a position parameter in the Laplace distribution function, and $b_2$ is determined according to $2b_2{}^2 = var(x_j)$ as a scale parameter in the Laplace distribution function, In this way, the Laplacian distribution function of the $x_j$ distribution may be determined. Then, the second current loss value is determined according to the first mean value, the first variance value, the second mean value and the second variance value. For example, the difference between the $x_i$ distribution and the $x_j$ distribution may be measured using relative entropy (or Kullback-Leibler (KL) divergence), that is, the second current loss value is determined. In an actual application, the difference (namely, a second current loss value) between the $x_i$ distribution and the $x_j$ distribution may alternatively be measured using a geometric distance (or referred to as a mean square error), or a Jensen-Shannon divergence, or a Wasserstein distance. By means of the present embodiment, the purpose of determining the second current loss value is realized, i.e., the purpose of measuring a distance between the distribution of the difference values between the respective pixel points in the first current predicted reconstructed image and the corresponding pixel points in the current actual reconstructed image and the distribution of the difference values between the respective pixel points in the second current predicted reconstructed image and the corresponding pixel points in the current actual reconstructed image is realized.

In an exemplary embodiment, the operation of determining the first mean value and the first variance value according to the difference values between the respective pixel points in the first current predicted reconstructed image and the corresponding pixel points in the current actual reconstructed image includes: determining the first mean value to be equal to a mean value of the difference values between pixel values of the respective pixel points in the first current predicted reconstructed image and pixel values of the corresponding pixel points in the current actual reconstructed image, and determining the first variance value to be equal to a variance value of the difference values between the pixel values of the respective pixel points in the first current predicted reconstructed image and the pixel values of the corresponding pixel points in the current actual reconstructed image; or adjusting, according to a preset adjustment parameter, the difference values between the pixel values of the respective pixel points in the first current predicted reconstructed image and the pixel values of the corresponding pixel points in the current actual reconstructed image to obtain a first set of adjusted difference values, wherein the first set of adjusted difference values corresponds to the respective pixel points; determining the first mean value to be equal to a mean value of the first set of adjusted difference values, and determining the first variance value to be equal to a variance value of the first set of adjusted difference values. In the embodiment, a mean value of the difference values between the pixel values of the respective pixel points in the first current predicted reconstructed image and the pixel values of the corresponding pixel points in the current actual reconstructed image may be determined as a first mean value, and a variance value of the difference values between the pixel values of the respective pixel points in the first current predicted reconstructed image and the pixel values of the corresponding pixel points in the current actual reconstructed image may be determined as a first variance value. Alternatively, in the embodiment, the difference values between the pixel values of the respective pixel points in the first current predicted reconstructed image and the pixel values of the corresponding pixel points in the current actual reconstructed image are adjusted according to a preset adjustment parameter so as to obtain a first set of adjusted difference values, and then the first mean and the first variance value are determined based on the first set of adjusted difference values. By means of the present embodiment, the purpose of determining the first mean value and the first variance value based on the difference values between the pixel values of the respective pixel points in the first current predicted reconstructed image and the pixel values of the corresponding pixel points in the current actual reconstructed image may be realized, or the purpose of adjusting the difference values between the pixel values of the respective pixel points in the first current predicted reconstructed image and the pixel values of the corresponding pixel points in the current actual reconstructed image based on a preset adjustment parameter may be realized.

In an exemplary embodiment, the operation of adjusting, according to a preset adjustment parameter, the difference values between the pixel values of the respective pixel points in the first current predicted reconstructed image and the pixel values of the corresponding pixel points in the current actual reconstructed image to obtain a first set of adjusted difference values includes: obtaining the first set of adjusted difference values according to a following formula:

$$x_i' = Tx_i + (1 - T)\mu,$$

where $1 \le i \le C*H*W$, wherein C, H, W are respectively a channel number, a height, and a width of the first current predicted reconstructed image, T is the preset adjustment parameter, $x_i$ is a difference value between a pixel value of an i-th pixel point in the first current predicted reconstructed image and a pixel value of an i-th pixel point in the current actual reconstructed image, $x_i'$ is an i-th difference value in the first set of adjusted difference values, and $\mu$ is a mean value of the difference values between the pixel values of the respective pixel points in the first current predicted reconstructed image and the pixel values of the corresponding pixel points in the current actual reconstructed image. In this embodiment, compared to the traditional knowledge distillation method, a learnable temperature parameter T is introduced, and a linear transformation is used as a mapping function, so as to obtain the first set of adjusted difference values. For example, the first set of adjusted difference values may be obtained according to a formula $$x_i' = Tx_i + (1 - T)\mu,$$

where T is the preset adjustment parameter. In practical applications, polynomial functions, learnable neural networks, or metric learning can alternatively be used as mapping functions to obtain the first set of adjusted difference values. In practical applications, depending on the training m needs of different network models, T may be set in a range from 0 to 1, such as 0.2, 0.5, or other values. Alternatively, T may also be set to a value greater than or equal to 1, such as 1, 1.2, or other values. The preset adjustment parameter T may be adjusted during the training until the requirements are met. Through the present embodiment, the purpose of introducing the temperature parameter T to adjust the distribution of the difference values between the pixel values in the current first predicted reconstructed image and the pixel values in the current actual reconstructed image.

In an exemplary embodiment, the operation of determining a second mean value and a second variance value according to the difference values between the respective pixel points in the second current predicted reconstructed image and the corresponding pixel points in the current actual reconstructed image includes: determining the second mean value to be equal to a mean value of the difference values between pixel values of the respective pixel points in the second current predicted reconstructed image and pixel values of corresponding pixel points in the current actual reconstructed image, and determining the second variance value to be equal to a variance value of the difference values between the pixel values of the respective pixel points in the second current predicted reconstructed image and the pixel values of the corresponding pixel points in the current actual reconstructed image; or adjusting, according to a preset adjustment parameter, the difference values between the pixel values of the respective pixel points in the second current predicted reconstructed image and the pixel values of the corresponding pixel points in the current actual reconstructed image to obtain a second set of adjusted difference values, wherein the second set of adjusted difference values corresponds to the respective pixel points; determining the second mean value to be equal to a mean value of the second set of adjusted difference values, and determining the second variance value to be equal to a variance value of the second set of adjusted difference values. In the embodiment, a mean value of the difference values between the pixel values of the respective pixel points in the second current predicted reconstructed image and the pixel values of the corresponding pixel points in the current actual reconstructed image may be determined as a second mean value, and a variance value of the difference values between the pixel values of the respective pixel points in the second current predicted reconstructed image and the pixel values of the corresponding pixel points in the current actual reconstructed image may be determined as a second variance value. Alternatively, in the embodiment, the difference values between the pixel values of the respective pixel points in the second current predicted reconstructed image and the pixel values of the corresponding pixel points in the current actual reconstructed image are adjusted according to a preset adjustment parameter so as to obtain a second set of adjusted difference values, and then the second mean and the second variance value are determined based on the second set of adjusted difference values. By means of the present embodiment, the purpose of determining the second mean value and the second variance value based on the difference values between the pixel values of the respective pixel points in the second current predicted reconstructed image and the pixel values of the corresponding pixel points in the current actual reconstructed image may be realized, or the purpose of adjusting the difference values between the pixel values of the respective pixel points in the second current predicted reconstructed image and the pixel values of the corresponding pixel points in the current actual reconstructed image based on a preset adjustment parameter may be realized.

In an exemplary embodiment, the operation of adjusting, according to a preset adjustment parameter, the difference values between the pixel values of the respective pixel points in the second current predicted reconstructed image and the pixel values of the corresponding pixel points in the current actual reconstructed image to obtain a second set of adjusted difference values includes: obtaining the second set of adjusted difference values according to a following formula:

$$x_j' = Tx_j + (1 - T)\mu,$$

where $1 \le j \le C*H*W$, wherein C, H, W are respectively a channel number, a height, and a width of the second current predicted reconstructed image, T is the preset adjustment parameter, $x_j$ is a difference value between a pixel value of a j-th pixel point in the second current predicted reconstructed image and a pixel value of a j-th pixel point in the current actual reconstructed image, $x_1'$ is a j-th difference value in the second set of adjusted difference values, and p is a mean value of the difference values between the pixel values of the respective pixel points in the second current predicted reconstructed image and the pixel values of the corresponding pixel points in the current actual reconstructed image. In this embodiment, compared to the traditional knowledge distillation method, a learnable temperature parameter T is introduced, and a linear transformation is used as a mapping function, so as to obtain the second set of adjusted difference values. For example, the second set of adjusted difference values may be obtained according to a formula $$x_i' = Tx_i + (1 - T)\mu,$$

where T is the preset adjustment parameter. In practical applications, polynomial functions, learnable neural networks, or metric learning can alternatively be used as mapping functions to obtain the second set of adjusted difference values. In practical applications, depending on the training needs of different network models, T may be set in a range from 0 to 1, such as 0.2, 0.5, or other values. Alternatively, T may also be set to a value greater than or equal to 1, such as 1, 1.2, or other values. The preset adjustment parameter T may be adjusted during the training until the requirements are met. Through the present embodiment, the purpose of introducing the temperature parameter T to adjust the distribution of the difference values between the pixel values in the current second predicted reconstructed image and the pixel values in the current actual reconstructed image.

In an exemplary embodiment, the operation of determining the second current loss value according to the first mean value, the first variance value, the second mean value, and the second variance value includes: determining the second current loss value according to a following formula:

$$\text{Loss}_2 = \ln \frac{b_T}{b_S} + \frac{|\mu_S - \mu_T|}{b_T} + \frac{b_S}{b_T} e^{\frac{|\mu_S - \mu_T|}{b_S}} - 1,$$

wherein $2b_s^2 = \text{var}(x_i)$ ($1 \leq i \leq C*H*W$), $2b_T^2 = \text{var}(x_j)$ ($1 \leq j \leq C*H*W$), wherein C, H, W are respectively a channel number, a height and a width of the first current predicted reconstructed image and the second current predicted reconstructed image, $x_i$ is a difference value between a pixel value of an i-th pixel point in the first current predicted reconstructed image and a pixel value of an i-th pixel point in the current actual reconstructed image, $x_j$ is a difference value between a pixel value of a j-th pixel point in the second current predicted reconstructed image and a pixel value of a j-th pixel point in the current actual reconstructed image, $\mu_s$ is the first mean value, $\text{var}(x_i)$ is the first variance value, $\mu_T$ is the second mean value, $\text{var}(x_j)$ is the second variance value, and $\text{Loss}_2$ is the second current loss value. In the embodiment, the second current loss value $\text{Loss}_2$ may be determined by using relative entropy (or referred to as KL divergence). In practical applications, the second current loss value $\text{Loss}_2$ may alternatively be determined by using a geometric distance (or referred to as a mean square error), or a Jensen-Shannon divergence, or a Wasserstein distance. By means of the present embodiment, the purpose of measuring a distance between the distribution of the difference values at the respective pixel points determined by the student image reconstruction model to be trained and the distribution of the difference values at the respective pixel points determined by the target teacher image reconstruction model is realized.

In an exemplary embodiment, the operation of determining the target loss value corresponding to the current sample image according to the first current loss value and the second current loss value includes: determining the target loss value corresponding to the current sample image to be equal to a sum of the first current loss value and the second current loss value. In the embodiment, the target loss value of the current sample image includes a first current loss value and a second current loss value, and the second current loss value is a loss constraint imposed by the difference values at the respective pixel points determined by the target teacher image reconstruction model on the difference values at the respective pixel points determined by the student image reconstruction model to be trained, thereby achieving the purpose of improving the accuracy of the student image reconstruction model to be trained.

Apparently, the embodiments described above are merely some of the embodiments of the present disclosure, rather than all of the embodiments. The present disclosure will be specifically described below in conjunction with exemplary embodiments.

In relevant technologies, for a classification problem with n categories, a neural network usually predicts a one-dimensional vector with a length n for a given image, where the k-th value of the one-dimensional vector represents the confidence predicted by the neural network for the k-th category. In the theory of knowledge distillation, it is believed that the distribution of confidences for categories other than the one with the highest confidence, as predicted by the "teacher" network, is also beneficial for the training of the "student" network and may improve the generalization ability of the "student" network. The distribution of these confidences is referred to as "dark knowledge". In the training of knowledge distillation, a "temperature" parameter T is introduced in both the "teacher" and "student" networks to make the predictions of the neural network smoother, allowing the "student" network to pay more attention to the "dark knowledge" of the "teacher" network during the training process. However, this approach cannot be directly applied to regression problems. For example, in super-resolution networks where the predicted results are the pixel values of an image, there are no classification logits to introduce existing knowledge distillation methods. If the output of the "teacher" network is directly used to supervise the "student" network during training, the poor predictions of the "teacher" network may also affect the training of the "student" network, leading to a decrease in the accuracy of the "student" network. Provided in an embodiment of the present disclosure is a new knowledge distillation method that can be applied to super-resolution algorithms. This method involves calculating a difference value $\Delta_T$ (corresponding to the second difference value) between the output of the "teacher" network (corresponding to the target teacher image reconstruction model) and the actual value, and a difference value $\Delta_S$ (corresponding to the first difference value) between the output of the "student" network (corresponding to the target student image reconstruction model, or the student image reconstruction model to be trained) and the actual value. Since super-resolution models typically use specific image reconstruction loss $L_{restruction}$, $\Delta_T$ and $\Delta_S$ can be assumed to follow a certain specific distribution. For example, when L1 loss is used as the image reconstruction loss $L_{restruction}$ for training, $\Delta_T$ and $\Delta_S$ can be assumed to follow a Laplace distribution; when L2 loss is used as the image reconstruction loss $L_{restruction}$ for training, $\Delta_T$ and $\Delta_S$ can be assumed to follow a Gaussian distribution.

In this distribution, we believe that the distribution in the non-zero value area (i.e., the part where the "teacher" network predicts have deviation from the actual value) still contains a certain "knowledge" (analogous to the "dark knowledge" in classic knowledge distillation). The "dark knowledge" is an approximate solution given by the "teacher" network and is worthy of learning. Therefore, we use $\Delta_T$ to constrain $\Delta_S$, and introduce the distribution distance measurement function $L_{distance}$ to measure the distributions of $\Delta_T$ and $\Delta_S$. In order to effectively allow the "student" network to learn the "dark knowledge" from the "teacher" network, analogous to the classic knowledge distillation method, a "temperature" parameter T and a mapping function $U(\Delta, T)$ are introduced. This mapping function will map the distribution $\Delta$ according to the value of T, and the larger the value of T is, the flatter the transformed $\Delta$ will be, thereby flattening the distribution $\Delta$, so that the "student" network can pay more attention to the non-zero value area of the "teacher" distribution (i.e., the "dark knowledge" of the "teacher" network) when calculating the loss using $L_{distance}$, and this allows the "student" network to more fully learn and utilize the "knowledge" provided by the "teacher" network. Moreover, the "temperature" parameter T is learnable, allowing the network to adaptively adjust this "temperature" parameter during the training to mitigate the impact of noise in the "teacher" network on the "student" network.

It should be noted that in the above statement, the image reconstruction loss $L_{restruction}$ includes but is not limited to L1 loss, L2 loss, and so on. The distance measurement function $L_{distance}$ includes but is not limited to geometric distance (mean squared error), relative entropy (KL divergence), Jensen-Shannon (JS) divergence, or Wasserstein distance, and so on. The mapping function $U(\Delta, T)$ includes but is not limited to linear functions, polynomial functions, learnable neural networks, and metric learning, and so on.

The following description takes L1 loss being the image reconstruction loss $L_{distance}$ for the super-resolution model as an example.

At operation 1, a "teacher" network is trained. FIG. 3 is a schematic diagram of training a teacher network according to some exemplary embodiments of the present disclosure. The "teacher" network is trained by using pre-prepared super-resolution training data. The predicted results of the "teacher" network are compared to the actual data using L1 loss for loss calculation, and the loss calculation may be performed as follows:

$$L_{restruction} = Loss_{l1}(X, Y) = \frac{1}{CHW}\sum_{i,j,k}^{C,H,W}|X_{i,j,k} - Y_{i,j,k}| \qquad (1)$$

wherein C, H and W are respectively the number of channels (i.e., the channel number) of an image, the height of the image and the width of the image. X is an image predicted by the network, and Y is a real image. After the training with the above loss until convergence (corresponding to the aforementioned satisfaction of the first preset loss condition), the corresponding "teacher" network is obtained.

At operation 2, a "student" network is trained. FIG. 4 is a schematic diagram of training a student network according to some exemplary embodiments of the present disclosure.

The same super-resolution training data is used to train the "student" network, and the loss mainly contains two parts, $$Loss_{student}(X, Y) = L_{restruction}(X, Y) + L_{distance}(\Delta_S, \Delta_T) \qquad (2)$$

wherein the form of L1 loss $L_{restruction}(X,Y)$ (corresponding to the described first loss value or the described first current loss value) is consistent with formula (1), and the second part $L_{distance}(\Delta_S, \Delta_T)$ is a distillation loss (corresponding to the described second loss value or the described second current loss value), wherein $\Delta_s$ is the distribution of the difference value between an image predicted by the "student" network and the actual data, and $\Delta_T$ is the distribution of the difference value between an image predicted by the "teacher" network and the actual data. Since both the "teacher" network and the "student" network use $\Delta_s$ to calculate a loss, it is assumed that a priori distribution of $\Delta_T$ is the Laplace distribution, $$Lplace(x) = \frac{1}{2b}e^{\frac{-|x-\mu|}{b}} \qquad (3)$$

wherein $$\mu = mean(x) \qquad (4)$$

$$2b^2 = var(x), b > 0 \qquad (5)$$

then, $$\Delta_S(x) = \frac{1}{2b_S}e^{\frac{-|x-\mu_S|}{b_S}} \qquad (6)$$

$$\Delta_T(y) = \frac{1}{2b_T}e^{\frac{-|y-\mu_T|}{b_T}} \qquad (7)$$

wherein x in formula (6) is the distribution of the difference values between respective pixel points in a reconstructed image predicted by the student network and corresponding pixel points in an actual reconstructed image (corresponding to the foregoing distribution of $x_i$ and distribution of $x_j$), $\mu$ in formula (4) corresponds to the foregoing first mean value and second mean value, and $var(x)$ in formula (5) corresponds to the foregoing first variance value and second variance value.

The KL divergence may be used as the $L_{distance}$ to measure the difference between the distributions $\Delta_s$ and $\Delta_T$, and it may be deduced that the KL divergence of the two Laplace distributions $\Delta_x$ and $\Delta_y$ is:

$$Loss_{KL}(\Delta_S, \Delta_T) = \int \Delta_S \ln\frac{\Delta_S}{\Delta_T}dx = \ln\frac{b_T}{b_S} + \frac{|\mu_S - \mu_T|}{b_T} + \frac{b_S}{b_T}e^{\frac{|\mu_S-\mu_T|}{b_S}} - 1 \qquad (8)$$

In the distribution $\Delta_T$, we believe that the distribution at non-zero value areas still has learnable "knowledge", and is equivalent to approximate solutions provided by the "teacher" network, which are beneficial for the training of the "student" network.

As an exemplary implementation, in order to enable the "student" network to better focus on these approximate solutions, analogous to traditional knowledge distillation methods, a learnable "temperature" parameter T (corresponding to the aforementioned preset adjustment parameter) is introduced. Meanwhile, linear transformation is used as the mapping function $U(\Delta,T)$ to adjust the distributions of $\Delta_s$ and $\Delta_T$, in the following form:

$$L = \frac{1}{2b} e^{\frac{-|x'-\mu|}{Tb}} \qquad (9)$$

wherein $$x' = (x, T) = Tx + (1-T)\mu \qquad (10)$$

By the above transformation, the distribution of x can be "flattened" without changing the mean value, allowing to adaptively adjust the distributions $\Delta_x$ and $\Delta_y$ through adjusting the "temperature" parameter T by training. This enables the "student" network to better learn beneficial knowledge from the "teacher" network.

After the "student" network is trained to convergence (corresponding to the aforementioned satisfaction of the second preset loss condition), the trained "student" network (corresponding to the target student image reconstruction model) can be obtained.

Upon completion of training, the "student" network can be deployed to the respective scenarios. The present method may significantly reduce computational load while ensuring accuracy close to that of the "teacher" network.

It should be noted that this exemplary embodiment introduces a new distillation loss for knowledge distillation in super-resolution models. Therefore, the specific structure and network training parameters of the "teacher" network and "student" network are not specifically limited.

Through this exemplary embodiment, the "teacher" model guides the "student" model during training, enabling the "student" model to achieve better results. The distillation loss proposed in this embodiment is applicable to super-resolution distillation tasks. The distillation loss is simple and user-friendly, and allows the accuracy of the trained "student" network to be essentially consistent with that of the more complex "teacher" network, while significantly reducing computational load. This addresses the problem of large computational requirements and difficulty in deployment associated with related technologies.

Figure 5:
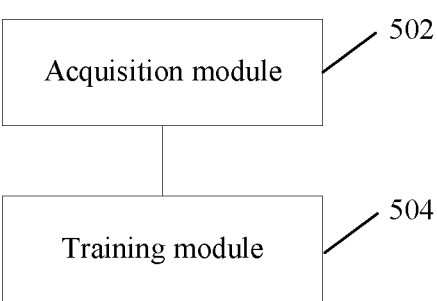
FIG. 5 is a structural block diagram of an apparatus for training an image reconstruction model according to some embodiments of the present disclosure.

An apparatus for training an image reconstruction model is also provided in the embodiments of the present disclosure. FIG. 5 is a structural block diagram of an apparatus for training an image reconstruction model according to some embodiments of the present disclosure. As shown in FIG. 5, the device includes:

an acquisition module 502, configured to acquire a target teacher image reconstruction model, a target sample image set and a actual reconstructed image set corresponding to the target sample image set, wherein the target teacher image reconstruction model is a model obtained by training, by using the target sample image set, a teacher image reconstruction model to be trained, and a loss value between a predicted reconstructed image set, which is determined by the target teacher image reconstruction model according to the target sample image set, and the actual reconstructed image set satisfies a first preset loss condition; and a training module 504, configured to train, by using the target sample image set, a student image reconstruction model to be trained, and end the training until a target loss value corresponding to the student image reconstruction model to be trained satisfies a second preset loss condition, so as to obtain a target student image reconstruction model, wherein the target loss value is a loss value determined according to a first loss value and a second loss value; the first loss value is a loss value between a predicted reconstructed image determined, according to a sample image in the target sample image set, by the student image reconstruction model to be trained and a corresponding actual reconstructed image in the actual reconstructed image set; the second loss value is a loss value determined according to a first difference value and a second difference value; the first difference value is a difference value determined according to difference values between respective pixel points in a first predicted reconstructed image and corresponding pixel points in a corresponding actual reconstructed image in the actual reconstructed image set; the first predicted reconstructed image is a predicted reconstructed image determined, according to the sample image in the target sample image set, by the student image reconstruction model to be trained; the second difference value is a difference value determined according to difference values between respective pixel points in a second predicted reconstructed image and corresponding pixel points in a corresponding actual reconstructed image in the actual reconstructed image set; and the second predicted reconstructed image is a predicted reconstructed image determined by the target teacher image reconstruction model according to the sample image in the target sample image set.

In an exemplary embodiment, the above training module 504 includes: an execution unit, configured to repeat the following operations until the target loss value corresponding to the student image reconstruction model to be trained satisfies the second preset loss condition: acquiring a current sample image in the target sample image set and a current actual reconstructed image, corresponding to the current sample image, in the actual reconstructed image set; inputting the current sample image to the student image reconstruction model to be trained, so as to obtain a first current predicted reconstructed image; determining a first current loss value according to the first current predicted reconstructed image and the current actual reconstructed image, wherein the first current loss value represents a loss between the first current predicted reconstructed image and the current actual reconstructed image; inputting the current sample image into the target teacher image reconstruction model to obtain a second current predicted reconstructed image; determining a second current loss value corresponding to the current sample image according to difference values between respective pixel points in the first current predicted reconstructed image and corresponding pixel points in the current actual reconstructed image and difference values between respective pixel points in the second current predicted reconstructed image and corresponding pixel points in the current actual reconstructed image; determining the target loss value corresponding to the current sample image according to the first current loss value and the second current loss value; when the target loss value corresponding to the current sample image satisfies the second preset loss condition, ending the training, so as to obtain the target student image reconstruction model; and when the target loss value corresponding to the current sample image does not satisfy the second preset loss condition, adjusting a parameter in the student image reconstruction model to be trained.

In an exemplary embodiment, the execution unit may determine the second current loss value corresponding to the current sample image in the following manner: acquiring the difference values between the respective pixel points in the first current predicted reconstructed image and the corresponding pixel points in the current actual reconstructed image; determining a first mean value and a first variance value according to the difference values between the respective pixel points in the first current predicted reconstructed image and the corresponding pixel points in the current actual reconstructed image; acquiring the difference values between the respective pixel points in the second current predicted reconstructed image and the corresponding pixel points in the current actual reconstructed image; determining a second mean value and a second variance value according to the difference values between the respective pixel points in the second current predicted reconstructed image and the corresponding pixel points in the current actual reconstructed image; and determining the second current loss value according to the first mean value, the first variance value, the second mean value, and the second variance value.

In an exemplary embodiment, the execution unit may determine the first mean value and the first variance value in the following manner: determining the first mean value to be equal to a mean value of the difference values between pixel values of the respective pixel points in the first current predicted reconstructed image and pixel values of the corresponding pixel points in the current actual reconstructed image, and determining the first variance value to be equal to a variance value of the difference values between the pixel values of the respective pixel points in the first current predicted reconstructed image and the pixel values of the corresponding pixel points in the current actual reconstructed image; or adjusting, according to a preset adjustment parameter, the difference values between the pixel values of the respective pixel points in the first current predicted reconstructed image and the pixel values of the corresponding pixel points in the current actual reconstructed image to obtain a first set of adjusted difference values, wherein the first set of adjusted difference values corresponds to the respective pixel points; determining the first mean value to be equal to a mean value of the first set of adjusted difference values, and determining the first variance value to be equal to a variance value of the first set of adjusted difference values. In an exemplary embodiment, the execution unit may obtain the first set of adjusted difference values in a following manner: obtaining the first set of adjusted difference values according to a following formula:

$$x_i' = Tx_i + (1 - T)\mu,$$

where $1 \leq i \leq C*H*W$, wherein C, H, W are respectively a channel number, a height, and a width of the first current predicted reconstructed image, T is the preset adjustment parameter, $x_i$ is a difference value between a pixel value of an i-th pixel point in the first current predicted reconstructed image and a pixel value of an i-th pixel point in the current actual reconstructed image, $x_1'$ is an i-th difference value in the first set of adjusted difference values, and $\mu$ is a mean value of the difference values between the pixel values of the respective pixel points in the first current predicted reconstructed image and the pixel values of the corresponding pixel points in the current actual reconstructed image.

In an exemplary embodiment, the execution unit may determine the second mean value and the second variance value in the following manner: determining the second mean value to be equal to a mean value of the difference values between pixel values of the respective pixel points in the second current predicted reconstructed image and pixel values of corresponding pixel points in the current actual reconstructed image, and determining the second variance value to be equal to a variance value of the difference values between the pixel values of the respective pixel points in the second current predicted reconstructed image and the pixel values of the corresponding pixel points in the current actual reconstructed image; or adjusting, according to a preset adjustment parameter, the difference values between the pixel values of the respective pixel points in the second current predicted reconstructed image and the pixel values of the corresponding pixel points in the current actual reconstructed image to obtain a second set of adjusted difference values, wherein the second set of adjusted difference values corresponds to the respective pixel points; determining the second mean value to be equal to a mean value of the second set of adjusted difference values, and determining the second variance value to be equal to a variance value of the second set of adjusted difference values.

In an exemplary embodiment, the execution unit may obtain the second set of adjusted difference values in the following manner: obtaining the second set of adjusted difference values according to a following formula:

$$x_j' = Tx_j + (1 - T)\mu,$$

where $1 \leq j \leq C*H*W$, wherein C, H, W are respectively a channel number, a height, and a width of the second current predicted reconstructed image, T is the preset adjustment parameter, $x_j$ is a difference value between a pixel value of a j-th pixel point in the second current predicted reconstructed image and a pixel value of a j-th pixel point in the current actual reconstructed image, $x_j'$ is a j-th difference value in the second set of adjusted difference values, and is a mean value of the difference values between the pixel values of the respective pixel points in the second current predicted reconstructed image and the pixel values of the corresponding pixel points in the current actual reconstructed image.

In an exemplary embodiment, the execution unit may determine the second current loss value in the following manner: determining the second current loss value according to a following formula:

$$Loss_2 = \ln \frac{b_T}{b_S} + \frac{|\mu_S - \mu_T|}{b_T} + \frac{b_S}{b_T} e^{\frac{|\mu_S - \mu_T|}{b_S}} - 1,$$

wherein $2b_s^2 = var(x_1)$ $(1 \leq i \leq C*H*W)$, $2b_T^2 = var(x_j)$ $(1 \leq j \leq C*H*W)$, wherein C, H, W are respectively a channel number, a height and a width of the first current predicted reconstructed image and the second current predicted reconstructed image, $x_i$ is a difference value between a pixel value of an i-th pixel point in the first current predicted reconstructed image and a pixel value of an i-th pixel point in the current actual reconstructed image, $x_j$ is a difference value between a pixel value of a j-th pixel point in the second current predicted reconstructed image and a pixel value of a j-th pixel point in the current actual reconstructed image, $\mu_s$ is the first mean value, $var(x_1)$ is the first variance value, $\mu_T$ is the second mean value, $\text{var}(x_j)$ is the second variance value, and $\text{Loss}_2$ is the second current loss value.

In an exemplary embodiment, the foregoing execution unit may determine the target loss value corresponding to the current sample image in the following manner: determining the target loss value corresponding to the current sample image to be equal to a sum of the first current loss value and the second current loss value.

It should be noted that the respective modules mentioned above may be implemented through software or hardware. For the latter, they can be implemented in various ways, including but not limited to: all the modules being located within the same processor; or alternatively, the respective modules being located in different processors in any combination.

The embodiments of the present disclosure also provide a computer-readable storage medium, which stores a computer program designed to execute the operations of any one of the methods as described in the exemplary embodiments.

In an exemplary embodiment, the computer-readable storage medium may include, but is not limited to, Universal Serial Bus (USB) drives, Read-Only Memory (ROM), Random Access Memory (RAM), external hard drives, disks, or optical discs, and various other media capable of storing computer programs.

Additionally, the embodiments of the present disclosure provide an electronic device including a memory and a processor. The memory stores a computer program, and the processor is configured to execute the computer program to perform the operations of any one of the exemplary embodiments. In an exemplary embodiment, the electronic device may also include a communication device and an input/output device, with the communication device being connected to the processor, as well as the input/output device.

The exemplary implementations in the embodiment can be referred to the exemplary embodiments and examples described above. It is clear that those having ordinary skill in the art should understand that the respective modules or operations disclosed in the embodiments of the present disclosure can be implemented using general computing devices, which can be centralized on a single computing device or distributed across a network of multiple computing devices. They can be implemented using program code executable by computing devices, stored in storage devices and executed by computing devices. In some cases, the operations shown or described can be executed in a different order, or made into separate integrated circuit modules, or multiple modules or operations can be integrated into a single integrated circuit module. Therefore, this disclosure is not limited to any specific combination of hardware and software.

The above is merely an exemplary embodiment of the present disclosure and is not intended to limit the disclosure. Those having ordinary skill in the art will appreciate that the disclosure can undergo various changes and modifications. All modifications, equivalents, improvements, etc., made within the scope of the principles of the present disclosure should be included within the scope of protection of the present disclosure.

What is claimed is:

1. A method for training an image reconstruction model, comprising:

acquiring a target teacher image reconstruction model, a target sample image set and a actual reconstructed image set corresponding to the target sample image set, wherein the target teacher image reconstruction model is a model obtained by training, by using the target sample image set, a teacher image reconstruction model to be trained, and a loss value between a predicted reconstructed image set, which is determined by the target teacher image reconstruction model according to the target sample image set, and the actual reconstructed image set satisfies a first preset loss condition; and training, by using the target sample image set, a student image reconstruction model to be trained, and ending the training until a target loss value corresponding to the student image reconstruction model to be trained satisfies a second preset loss condition, so as to obtain a target student image reconstruction model, wherein the target loss value is a loss value determined according to a first loss value and a second loss value; the first loss value is a loss value between a predicted reconstructed image determined, according to a sample image in the target sample image set, by the student image reconstruction model to be trained and a corresponding actual reconstructed image in the actual reconstructed image set; the second loss value is a loss value determined according to a first difference value and a second difference value; the first difference value is a difference value determined according to difference values between respective pixel points in a first predicted reconstructed image and corresponding pixel points in a corresponding actual reconstructed image in the actual reconstructed image set; the first predicted reconstructed image is a predicted reconstructed image determined, according to the sample image in the target sample image set, by the student image reconstruction model to be trained; the second difference value is a difference value determined according to difference values between respective pixel points in a second predicted reconstructed image and corresponding pixel points in a corresponding actual reconstructed image in the actual reconstructed image set; and the second predicted reconstructed image is a predicted reconstructed image determined by the target teacher image reconstruction model according to the sample image in the target sample image set.

2. The method according to claim 1, wherein the training, by using the target sample image reconstruction model to be trained, and ending the training until a target loss value corresponding to the student image reconstruction model to be trained satisfies a second preset loss condition comprises:

repeating the following operations until the target loss value corresponding to the student image reconstruction model to be trained satisfies the second preset loss condition:

acquiring a current sample image in the target sample image set and a current actual reconstructed image, corresponding to the current sample image, in the actual reconstructed image set;

inputting the current sample image to the student image reconstruction model to be trained, so as to obtain a first current predicted reconstructed image;

determining a first current loss value according to the first current predicted reconstructed image and the current actual reconstructed image, wherein the first current loss value represents a loss between the first current predicted reconstructed image and the current actual reconstructed image;

inputting the current sample image into the target teacher image reconstruction model to obtain a second current predicted reconstructed image;

determining a second current loss value corresponding to the current sample image according to difference values between respective pixel points in the first current predicted reconstructed image and corresponding pixel points in the current actual reconstructed image and difference values between respective pixel points in the second current predicted reconstructed image and corresponding pixel points in the current actual reconstructed image;

determining the target loss value corresponding to the current sample image according to the first current loss value and the second current loss value;

when the target loss value corresponding to the current sample image satisfies the second preset loss condition, ending the training, so as to obtain the target student image reconstruction model; and when the target loss value corresponding to the current sample image does not satisfy the second preset loss condition, adjusting a parameter in the student image reconstruction model to be trained.

3. The method according to claim 2, wherein the determining a second current loss value corresponding to the current sample image according to difference values between respective pixel points in the first current predicted reconstructed image and corresponding pixel points in the current actual reconstructed image and difference values between respective pixel points in the second current predicted reconstructed image and corresponding pixel points in the current actual reconstructed image comprises:

acquiring the difference values between the respective pixel points in the first current predicted reconstructed image and the corresponding pixel points in the current actual reconstructed image;

determining a first mean value and a first variance value according to the difference values between the respective pixel points in the first current predicted reconstructed image and the corresponding pixel points in the current actual reconstructed image;

acquiring the difference values between the respective pixel points in the second current predicted reconstructed image and the corresponding pixel points in the current actual reconstructed image;

determining a second mean value and a second variance value according to the difference values between the respective pixel points in the second current predicted reconstructed image and the corresponding pixel points in the current actual reconstructed image; and determining the second current loss value according to the first mean value, the first variance value, the second mean value, and the second variance value.

4. The method according to claim 3, wherein the determining a first mean value and a first variance value according to the difference values between the respective pixel points in the first current predicted reconstructed image and the corresponding pixel points in the current actual reconstructed image comprises:

determining the first mean value to be equal to a mean value of the difference values between pixel values of the respective pixel points in the first current predicted reconstructed image and pixel values of the corresponding pixel points in the current actual reconstructed image, and determining the first variance value to be equal to a variance value of the difference values between the pixel values of the respective pixel points in the first current predicted reconstructed image and the pixel values of the corresponding pixel points in the current actual reconstructed image; or adjusting, according to a preset adjustment parameter, the difference values between the pixel values of the respective pixel points in the first current predicted reconstructed image and the pixel values of the corresponding pixel points in the current actual reconstructed image to obtain a first set of adjusted difference values, wherein the first set of adjusted difference values corresponds to the respective pixel points; determining the first mean value to be equal to a mean value of the first set of adjusted difference values, and determining the first variance value to be equal to a variance value of the first set of adjusted difference values.

5. The method according to claim 4, wherein the adjusting, according to a preset adjustment parameter, the difference values between the pixel values of the respective pixel points in the first current predicted reconstructed image and the pixel values of the corresponding pixel points in the current actual reconstructed image to obtain a first set of adjusted difference values comprises:

obtaining the first set of adjusted difference values according to a following formula:

$$x_i' = Tx_i + (1 - T)\mu, \text{ where } 1 \le i \le C * H * W,$$

wherein C, H, W are respectively a channel number, a height, and a width of the first current predicted reconstructed image, T is the preset adjustment parameter, $x_i$ is a difference value between a pixel value of an i-th pixel point in the first current predicted reconstructed image and a pixel value of an i-th pixel point in the current actual reconstructed image, $x_i'$ is an i-th difference value in the first set of adjusted difference values, and $\mu$ is a mean value of the difference values between the pixel values of the respective pixel points in the first current predicted reconstructed image and the pixel values of the corresponding pixel points in the current actual reconstructed image.

6. The method according to claim 4, wherein the adjusting, according to a preset adjustment parameter, the difference values between the pixel values of the respective pixel points in the first current predicted reconstructed image and the pixel values of the corresponding pixel points in the current actual reconstructed image to obtain a first set of adjusted difference values comprises:

obtaining the first set of adjusted difference values by using polynomial functions, learnable neural networks, or metric learning.

7. The method according to claim 4, further comprising:

adjusting the preset adjustment parameter during the training until requirements are met.

8. The method according to claim 3, wherein the determining a second mean value and a second variance value according to the difference values between the respective pixel points in the second current predicted reconstructed image and the corresponding pixel points in the current actual reconstructed image comprises:

determining the second mean value to be equal to a mean value of the difference values between pixel values of the respective pixel points in the second current predicted reconstructed image and pixel values of corresponding pixel points in the current actual reconstructed image, and determining the second variance value to be equal to a variance value of the difference values between the pixel values of the respective pixel points in the second current predicted reconstructed image and the pixel values of the corresponding pixel points in the current actual reconstructed image; or adjusting, according to a preset adjustment parameter, the difference values between the pixel values of the respective pixel points in the second current predicted reconstructed image and the pixel values of the corresponding pixel points in the current actual reconstructed image to obtain a second set of adjusted difference values, wherein the second set of adjusted difference values corresponds to the respective pixel points; determining the second mean value to be equal to a mean value of the second set of adjusted difference values, and determining the second variance value to be equal to a variance value of the second set of adjusted difference values.

9. The method according to claim 8, wherein the adjusting, according to a preset adjustment parameter, the difference values between the pixel values of the respective pixel points in the second current predicted reconstructed image and the pixel values of the corresponding pixel points in the current actual reconstructed image to obtain a second set of adjusted difference values comprises:

obtaining the second set of adjusted difference values according to a following formula:

$$x_j' = Tx_j + (1 - T)\mu, \text{ where } 1 \le j \le C * H * W,$$

wherein C, H, W are respectively a channel number, a height, and a width of the second current predicted reconstructed image, T is the preset adjustment parameter, $x_j$ is a difference value between a pixel value of a j-th pixel point in the second current predicted reconstructed image and a pixel value of a j-th pixel point in the current actual reconstructed image, $x_j'$ is a j-th difference value in the second set of adjusted difference values, and $\mu$ is a mean value of the difference values between the pixel values of the respective pixel points in the second current predicted reconstructed image and the pixel values of the corresponding pixel points in the current actual reconstructed image.

10. The method according to claim 8, wherein the adjusting, according to a preset adjustment parameter, the difference values between the pixel values of the respective pixel points in the second current predicted reconstructed image and the pixel values of the corresponding pixel points in the current actual reconstructed image to obtain a second set of adjusted difference values comprises:

obtaining the second set of adjusted difference values by using polynomial functions, learnable neural networks, or metric learning.

11. The method according to claim 8, further comprising:

adjusting the preset adjustment parameter during the training until requirements are met.

12. The method according to claim 3, wherein the determining the second current loss value according to the first mean value, the first variance value, the second mean value, and the second variance value comprises:

determining the second current loss value according to a following formula:

$$\text{Loss}_2 = \ln\frac{b_T}{b_S} + \frac{|\mu_S - \mu_T|}{b_T} + \frac{b_S}{b_T}e^{\frac{|\mu_S - \mu_T|}{b_S}} - 1,$$

-continued
$$\text{wherein } 2b_S^2 = \text{var}(x_i)(1 \le i \le C * H * W),$$

$$2b_T^2 = \text{var}(x_j)(1 \le j \le C * H * W),$$

wherein C, H, W are respectively a channel number, a height and a width of the first current predicted reconstructed image and the second current predicted reconstructed image, $x_i$ is a difference value between a pixel value of an i-th pixel point in the first current predicted reconstructed image and a pixel value of an i-th pixel point in the current actual reconstructed image, $x_j$ is a difference value between a pixel value of a j-th pixel point in the second current predicted reconstructed image and a pixel value of a j-th pixel point in the current actual reconstructed image, $\mu_s$ is the first mean value, $\text{var}(x_i)$ is the first variance value, $\mu_T$ is the second mean value, $\text{var}(x_j)$ is the second variance value, and $\text{Loss}_2$ is the second current loss value.

13. The method according to claim 3, wherein the determining the second current loss value according to the first mean value, the first variance value, the second mean value, and the second variance value comprises:

determining the second current loss value by measuring a difference between the difference values between respective pixel points in the first current predicted reconstructed image and corresponding pixel points in the current actual reconstructed image and difference values between respective pixel points in the second current predicted reconstructed image and corresponding pixel points in the current actual reconstructed image using relative entropy, a geometric distance, or a Jensen-Shannon divergence, or a Wasserstein distance.

14. The method according to claim 2, wherein the determining the target loss value corresponding to the current sample image according to the first current loss value and the second current loss value comprises:

determining the target loss value corresponding to the current sample image to be equal to a sum of the first current loss value and the second current loss value.

15. The method according to claim 1, wherein the first preset loss condition is that the loss value corresponding to the target teacher image reconstruction model reaches a convergence condition.

16. The method according to claim 1, wherein the second preset loss condition is that the loss value corresponding to the target student image reconstruction model reaches a convergence condition.

17. The method according to claim 1, wherein the difference values between the respective pixel points in the first current predicted reconstructed image and the corresponding pixel points in the current actual reconstructed image follow a specific distribution; and the difference values between the respective pixel points in the second current predicted reconstructed image and the corresponding pixel points in the current actual reconstructed image also follow a specific distribution.

18. The method according to claim 17, wherein when using L1 loss as an image reconstruction loss for the training, the difference values between the respective pixel points follow a Laplace distribution; and when using L2 loss as the image reconstruction loss for the training, the difference values between the respective pixel points follow a Gaussian distribution.

19. Non-transitory computer-readable storage medium, wherein the computer-readable storage medium stores a program, wherein the program, when running on a processor, causes the processor to execute the following operations:

acquiring a target teacher image reconstruction model, a target sample image set and a actual reconstructed image set corresponding to the target sample image set, wherein the target teacher image reconstruction model is a model obtained by training, by using the target sample image set, a teacher image reconstruction model to be trained, and a loss value between a predicted reconstructed image set, which is determined by the target teacher image reconstruction model according to the target sample image set, and the actual reconstructed image set satisfies a first preset loss condition; and training, by using the target sample image set, a student image reconstruction model to be trained, and ending the training until a target loss value corresponding to the student image reconstruction model to be trained satisfies a second preset loss condition, so as to obtain a target student image reconstruction model, wherein the target loss value is a loss value determined according to a first loss value and a second loss value; the first loss value is a loss value between a predicted reconstructed image determined, according to a sample image in the target sample image set, by the student image reconstruction model to be trained and a corresponding actual reconstructed image in the actual reconstructed image set; the second loss value is a loss value determined according to a first difference value and a second difference value; the first difference value is a difference value determined according to difference values between respective pixel points in a first predicted reconstructed image and corresponding pixel points in a corresponding actual reconstructed image in the actual reconstructed image set; the first predicted reconstructed image is a predicted reconstructed image determined, according to the sample image in the target sample image set, by the student image reconstruction model to be trained; the second difference value is a difference value determined according to difference values between respective pixel points in a second predicted reconstructed image and corresponding pixel points in a corresponding actual reconstructed image in the actual reconstructed image set; and the second predicted reconstructed image is a predicted reconstructed image determined by the target teacher image reconstruction model according to the sample image in the target sample image set.

20. An electronic device, comprising a memory and a processor, wherein the memory stores a computer program, and the processor is configured to run the computer program to execute the following operations:

acquiring a target teacher image reconstruction model, a target sample image set and a actual reconstructed image set corresponding to the target sample image set, wherein the target teacher image reconstruction model is a model obtained by training, by using the target sample image set, a teacher image reconstruction model to be trained, and a loss value between a predicted reconstructed image set, which is determined by the target teacher image reconstruction model according to the target sample image set, and the actual reconstructed image set satisfies a first preset loss condition; and training, by using the target sample image set, a student image reconstruction model to be trained, and ending the training until a target loss value corresponding to the student image reconstruction model to be trained satisfies a second preset loss condition, so as to obtain a target student image reconstruction model, wherein the target loss value is a loss value determined according to a first loss value and a second loss value; the first loss value is a loss value between a predicted reconstructed image determined, according to a sample image in the target sample image set, by the student image reconstruction model to be trained and a corresponding actual reconstructed image in the actual reconstructed image set; the second loss value is a loss value determined according to a first difference value and a second difference value; the first difference value is a difference value determined according to difference values between respective pixel points in a first predicted reconstructed image and corresponding pixel points in a corresponding actual reconstructed image in the actual reconstructed image set; the first predicted reconstructed image is a predicted reconstructed image determined, according to the sample image in the target sample image set, by the student image reconstruction model to be trained; the second difference value is a difference value determined according to difference values between respective pixel points in a second predicted reconstructed image and corresponding pixel points in a corresponding actual reconstructed image in the actual reconstructed image set; and the second predicted reconstructed image is a predicted reconstructed image determined by the target teacher image reconstruction model according to the sample image in the target sample image set.

\* \* \* \* \*